United States Patent [19]

Harris et al.

[11] 4,118,835
[45] Oct. 10, 1978

[54] ELASTIC FASTENER

[75] Inventors: Richard D. Harris, Albany; Franklin G. Smith; Jerome F. Moshofsky, both of Portland, all of Oreg.

[73] Assignee: R. D. Bussard & Son, Inc., Albany, Oreg.

[21] Appl. No.: 789,024

[22] Filed: Apr. 20, 1977

[51] Int. Cl.² .............................................. A44B 1/18
[52] U.S. Cl. .................. 24/73 MC; 24/90 R; 24/102 A
[58] Field of Search ............... 24/73 R, 73 MC, 72.5, 24/72.7, 90 R, 90 A, 90 B, 90 C, 102 R, 102 A, 102 FC, 102 T

[56] References Cited

U.S. PATENT DOCUMENTS

| 1,651,437 | 12/1927 | Bochonuk | 24/102 A |
|---|---|---|---|
| 1,815,624 | 7/1931 | Keillor | 24/102 A |
| 2,148,401 | 2/1939 | Ellis | 24/73 MC |
| 2,983,006 | 5/1961 | Schafer | 24/90 R |

FOREIGN PATENT DOCUMENTS

| 207,151 | 1/1960 | Austria | 24/102 A |
|---|---|---|---|
| 377,390 | 7/1932 | United Kingdom | 24/102 A |

Primary Examiner—Louis K. Rimrodt
Attorney, Agent, or Firm—Klarquist, Sparkman, Campbell, Leigh, Hall & Whinston

[57] ABSTRACT

A one-piece elastic fastener includes a pair of spaced elastic, generally dish-shaped head members adapted to fit on opposite sides of pieces of material to be joined. The head members each have a rim and are disposed concavely inwardly with their rims facing each other. An elastic shank member joins the head members and is adapted to pass through an opening in the pieces of material. An elongated loop member is centrally attached to one of the head members and is adapted to pull it through an opening in the pieces of material when the head member is folded back to divide it into two generally flattened halves extended outwardly of the fastener. The fastener is made of elastomeric material having a durometer of between about 65 and 75.

5 Claims, 6 Drawing Figures

ELASTIC FASTENER

BACKGROUND OF THE INVENTION

1. Field of the Invention

The present invention relates to fasteners and more particularly to threadless elastic fasteners suitable for joining together two or more layers of either rigid or flexible material.

2. Description of the Prior Art

Heretofore two or more layers of rigid material have been joined together by various types of threaded fasteners such as screws or bolts, or by various types of threadless fasteners such as nails, staples or rivets, or by various types of bonding cements.

Layers of flexible materials such as fabrics can be joined together by some of the above fastening means such as bonding cements, staples and rivets. In addition, fabrics can be joined by thread or if provided with grommetted or other holes, by rope or cord. For example, heretofore fabric laundry baskets have been attached to their mobile metal frames by rope threaded through grommets along the doubled-over marginal edges of the fabric. However, such ropes wear out and must be replaced periodically, and such replacement is annoying, troublesome and time consuming.

Moreover all of the above-mentioned fastening menas have certain disadvantages. For example, most of the above threaded and unthreaded fasteners require suitable tools or equipment for installation. Some such fasteners are also difficult and time consuming to install. Bonding cements usually require special preparation of the materials to be joined and require selection of the proper cement to bond specific materials. Cement bonds, if not properly applied, or if of insufficient strength, may not be permanent.

Accordingly, there is a need for a quick and easy method and means for joining two or more layers of material together permanently, without the use of tools, to replace the aforementioned prior art fastening means and methods in selected applications.

SUMMARY OF THE INVENTION

The present invention comprises a one-piece rivet-like elastic fastener, and a method of fastening and fastened assembly utilizing the elastic fastener. The fastener, made of polyurethane, rubber or other materials having similar properties, is particularly suited for joining together several layers of flexible or rigid materials in applications in which the joints themselves will not be highly stressed in tension or shear. The elastic fastener of the invention has particular utility in joining together flexible materials such as canvas, fabric and plastic sheeting through grommetted openings.

The fastener of the present invention comprises a pair of elastic flange means adapted to fit on opposite sides of a plurality of pieces of material and retain the same in face-to-face juxtaposition. An elastic shank joins the flange means and is adapted to pass through an opening in the pieces of material. The fastener is desirably made of elastomeric material having a durometer of between about 65 and 75.

The fastener further comprises elongated pulling means centrally attached to one of the pair of elastic flange means. Such pulling means desirably comprises an elongated loop adapted to pass through the opening in the pieces of material.

The method of the present invention comprises forming a one-piece fastener having a pair of spaced elastic flange means adapted to fit on opposite sides of a plurality of pieces of material when the same are placed in face-to-face juxtaposition, an elastic shank joning the flange means and adapted to pass through aligned openings in the pieces of material to be joined, and pulling means attached to one of the flange means to pull such one flange means in a direction opposed to the other flange means.

The method further comprises folding such one flange means to divide the same into two generally flattened portions extending outwardly of the fastener, along and on opposite sides of the attached pulling means.

The method further comprises inserting the pulling means and the flattened portions of the one flange means through the aligned openings in the pieces of material to be joined and then pulling on the pulling means to pull the flattened portions of the one flange means through the opening, whereby the pair of flange means become seated on opposite sides of the assembly of materials to be joined.

The method further comprises an optional step of cutting off the pulling means from its attached flange means, after such flange means has been pulled through the openings in the pieces of material.

Because of the elasticity of the fastener's shank and the action of the flanges, the assembled layers of material are held together in compression. The degree of compression of the materials at the joint can be controlled by controlling the relaxed length of the fastener shank as compared with the total thickness of the layers of material at the joint.

A primary object of the invention is to provide a fastener having the following characteristics, features and advantages:
 (a) one-piece threadless construction;
 (b) made from elastomeric material;
 (c) high strength;
 (d) high elasticity;
 (e) economical;
 (f) quick and easy installation;
 (g) installation without tools;
 (h) applicability to flexible and rigid materials;
 (i) long life;
 (j) high resistance to wear;
 (k) high resistance to accidental removal;
 (l) disposability;
 (m) sanitary; and
 (n) capability of sealing a joint Other primary objects are to provide a method of joining layers of material together using a one-piece, threadless double-headed elastic fastener and a fastened assembly including multiple layers of material joined together with a one-piece, threadless, double-threaded elastic fastener.

DESCRIPTION OF A PREFERRED EMBODIMENT

Figure 1:
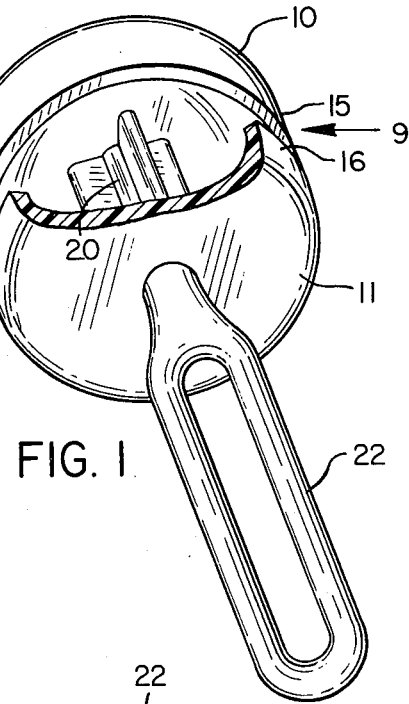
FIG. 1 is a perspective view of an elastic fastener made in accordance with the present invention.

The elastic fastener 9 of the present invention generally resembles an installed rivet in shape but not in physical characteristics. As shown in the drawings, it includes a pair of spaced elastic, generally dish-shaped head or flange members 10, 11 which are adapted to fit on opposite sides of a plurality of pieces of flexible material as, for example, pieces of coated fabric 12 having an opening 13 therethrough and in which a metal grommet 14 has been inserted in the usual fashion. Each of the head members 10, 11 has a rim 15, 16, respectively, extending circumferentially there around. The head members 10, 11 are positioned such that their dish-shapes are disposed concavely inwardly with their rims 15, 16 facing each other.

Figure 4:
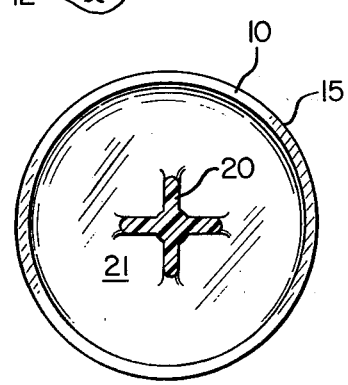
FIG. 4 is a view taken on line 4—4 of FIG. 3.

The head members 10, 11 are joined by an elastic shank member 20 which is adapted to pass through the opening 13 in the pieces of material 12. Desirably, shank member 20 may be fabricated in the shape of a cross as illustrated in FIG. 4, for simplicity in molding, although it may also be made in the shape of a tee, or it may be made of circular tubular or other desired cross sectional shape.

Figure 3:
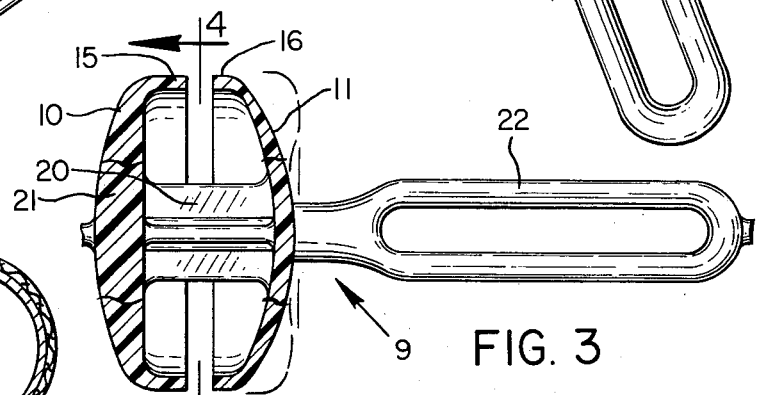
FIG. 3 is a side elevational view, partly in section, of the fastener of the present invention, illustrating in dashed lines the deformability of one of the flange members which occurs during the insertion of the same through an opening in pieces of flexible material to be joined.
Figure 5:
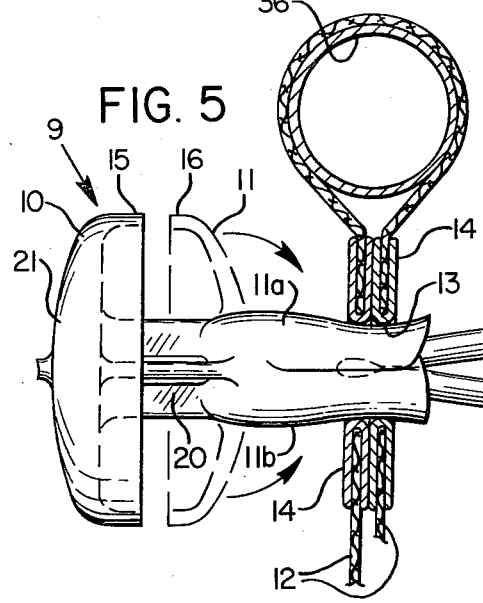
FIG. 5 is a side elevational view of the fastener of the present invention as it is being inserted through pieces of material to be joined, as for example, in the fabrication of the basket illustrated in FIG. 2.
Figure 6:
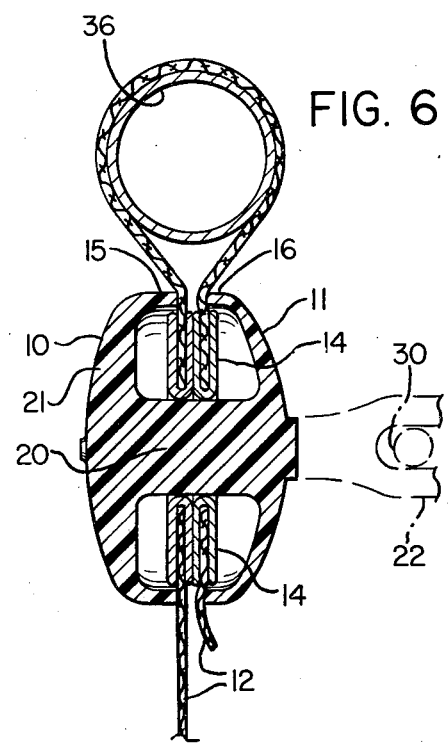
FIG. 6 is a sectional view taken on line 6—6 of FIG. 2, illustrating in dashed lines the pulling means optionally cut off after the fastener has been inserted through the opening in the materials and the flange members seated in their final position.

As illustrated in FIGS. 3, 5 and 6, one of the head members 10 is fabricated with a thicker bottom or base 21 than is the other head member 11 so as to resist flexing and thus resist being drawn through an opening in the material to which the fastener is to be attached during installation.

An elongated loop member 22 is centrally attached to the head member 11 and comprises a long, narrow loop in the shape of an eye member, whereby the loop member 22 may serve as a pulling means for pulling the head member 11 through opening 13 in the pieces of material 12 to be joined.

The fastener of the present invention is desirably made of elastomeric material such as polyurethane or rubber having a durometer of between about 65 and 75 and desirably, about 70. The fastener may be molded in an aluminum mold, for example, using a thermosetting polyurethane, or it may be fabricated from a cold-setting polyurethane which is heated in an extruder and then screw injected into a plastic mold and cured by cooling in the mold. Elastomers which are either heat setting or cold setting may be used. Alternatively, the fastener may be from rubber by injection molding.

Although the head members 10, 11 in the fastener are illustrated in the drawings as dish-shaped, they may be fabricated as flat flange members, or they may be made having a plurality of radially extending, finger-like flange members extending perpendicularly to the shank member 20. However, the dish-shaped flanges shown have the advantage of providing an effective water seal at the assembled joint, as will be apparent from FIG. 6.

The method of inserting the fastener of the present invention through a plurality of flexible sheets of material, as for example, the multiple layers 12 illustrated in the drawings, comprises placing the fastener 9 in a position such that its longitudinal axis is perpendicular to the pieces 12 and centrally aligned with the openings 13 therethrough. The flange member 11 is then folded back along loop member 22, as illustrated in FIG. 5, to divide the flange member into two generally flattened portions 11a, 11b which extend outwardly of the fastener on opposite sides of the loop member 22. The loop member 22 is then inserted through the grommets 14 which define the opening 13 in the pieces of material 12, followed by at least the leading edges of the flattened portions 11a, 11b of the reversely folded-back flange member 11, as illustrated in FIG. 5. The loop member is then pulled in the direction of the arrow 25 to pull the entire head member 11 through the opening 13 as shown. When the head member 11 emerges fully on the opposite side of the assembly from head member 10, the elasticity of the material causes member 11 to spring back to its original dish-shape, resulting in the rims 15, 16 being disposed on opposite sides of the pieces of material 12, thereby forming a snug permanent connection therebetween. As loop 22 is pulled to draw flange 11 through the grommet openings, the thickness of flange 10 causes it to resist being pulled through such openings. Thus shank 20, loop 22 and flange 11 are stretched greatly during the pulling process, reducing their cross-sectional dimensions so as to enable the mass of flange material 11 and loop 22 to slip through the openings although their combined masses when relaxed would not normally permit this.

If desired, a lever (not shown) may be inserted in the loop member 22 and used to pull the folded back portion 11a, 11b through the grommets 14 easily and quickly. Optionally, the loop member 22 may be cut off as illustrated in FIG. 6 after installation of the fastener to leave a generally rivet-like fastener forming the ultimate connection. Also, if the fastener is inserted through a very large opening, such as through an opening in the cyclone-type wire fence in attaching a windscreen to such fence, a locking stick 30 (FIG. 6) may be inserted through loop 22 after installation of the fastener to lock the fastener and screen to the fence.

Figure 2:
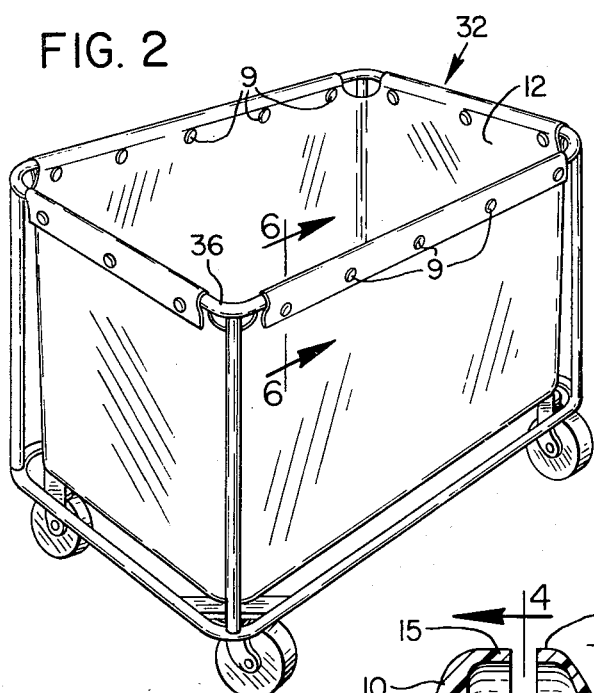
FIG. 2 is a perspective view of a laundry basket with sides of flexible material, such as plastic or cloth, the fabrication of which is facilitated by use of the fasteners and methods of the present invention.

The fastener of the present invention is ideally suited for use in fabricating such articles as the laundry basket 32 illustrated in FIG. 2, replacing the rope usually used to tie the canvas or plastic material 12 to the basket frame 36. The fasteners are long lasting and do not require periodic replacement, unlike the aforementioned rope. The fastener is also ideally suited for joining materials used in fabricating tennis court wind screens. Fasteners constructed in accordance with the present invention form permanent connections between flexible or rigid materials to be joined. They do not slip, nor will they accidentally pop out.

Fasteners according to the present invention can also be used in installations where sanitation is important. They are molded quickly and inexpensively. They are also quickly and efficiently installed.

In fact the fastener can be attached to a single layer of material in the manner described, and then the loop 22 used for attaching cord, rope or similar tie-down means in tent and tarpaulin applications.

Having illustrated and described the principles of our invention by what is presently a preferred embodiment, it should be apparent to those skilled in the art that such embodiment may be modified in arrangement and detail without departing from such principles. We claim as our invention all such modifications as come within the true spirit and scope of the following claims.

We claim:

1. An elastic fastener for fastening together layers of material, comprising
   a pair of elastic flange means adapted to fit on opposite sides of a plurality of layers of material and retain the same in face-to-face juxtaposition; and
   an elastic shank means joining said flange means and adapted to pass through an opening in said layers of material,
   one of said flange means having a base thickness enabling it to be flexed to facilitate pulling said one flange means through said opening, the other of said flange means having a thicker base than said one flange means so as to resist flexing and passage through said opening,
   said flange and shank means being made of elastomeric material having a durometer of between about 65 and 75.

2. An elastic fastener for fastening together layers of material, comprising
   a pair of spaced elastic, generally dish-shaped head members adapted to fit on opposite sides of layers of material to be joined, said head members each having a rim, said head members being disposed concavely inwardly with their rims facing each other; and
   an elastic shank member joining said head members and adapted to pass through an opening in said layers of material,
   one of said dish-shaped head members having a thicker bottom and thus less flexibility than the other of said dish-shaped head members so as to resist passage through said opening.

3. An elastic fastener as in claim 2, further comprising pulling means attached to the exterior of said other of said head members for pulling the same through said opening in said layers of material to be joined.

4. A fastener according to claim 3, wherein said other head member has a bottom thickness which enables said member to be folded back away from said one head member along opposite sides of said pulling means to facilitate insertion of said other head member into said opening and pulling it through said opening.

5. A fastener according to claim 2 composed of an elastomeric material having a durometer in the range of about 65 to 75.

* * * * *